Jan. 2, 1923.

W. J. KELLY.
LOCK WASHER RETAINER.
FILED JUNE 25, 1921.

1,440,684

Wm J. Kelly
INVENTOR

BY
ATTORNEY

Patented Jan. 2, 1923.

1,440,684

UNITED STATES PATENT OFFICE.

WILLIAM J. KELLY, OF YOUNGSTOWN, OHIO.

LOCK-WASHER RETAINER.

Application filed June 25, 1921. Serial No. 480,266.

*To all whom it may concern:*

Be it known that WILLIAM J. KELLY, citizen of the United States of America, residing at Youngstown, in the county of Mahoning and State of Ohio, has invented certain new and useful Improvements in Lock-Washer Retainers, of which the following is a specification.

This invention relates to lock washer retainers, and has for its principal object the securing of lock washers from falling out of place due to the breaking of the washers.

With these and other objects in view the invention consists of the novel arrangement and construction of parts hereinafter more fully described and pointed out in the claim.

Figure 1:
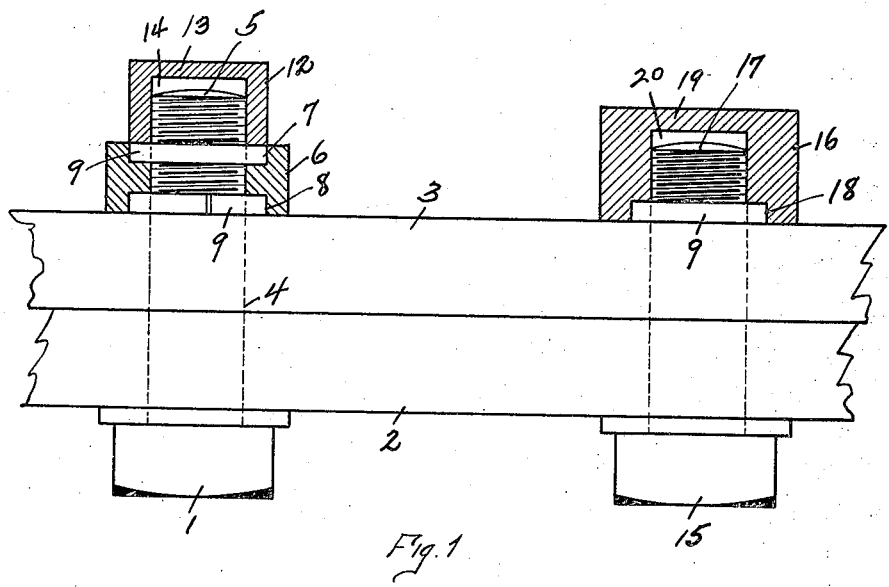
Figure 1 is a side elevation of the device partly in cross section.
Figure 2:
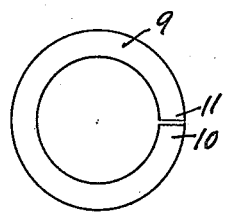
Figure 2 is a top plan view of lock washer.
Figure 3:
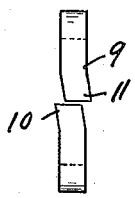
Figure 3 is a side view of lock washer.

In order to illustrate the manner of using my invention, I have shown a bolt 1 passing through beams 2 and 3 at point 4. The thread end 5 of the bolt 1 has threaded thereon: first, a primary nut 6, with upper recess 7, and a lower recess 8. Into these recesses 7 and 8 are placed lock washers 9. The nut 6 is turned down, forcing the ends 10 and 11 of the lock washers 9 into alignment. The secondary nut 12 is now turned down upon the end 5 of the bolt 1 so that the upper lock washer 9 is forced into the recess 7 so that the ends 10 and 11 are held in alignment.

It will be seen that the secondary nut 12 is provided with a cap portion 13, thereby forming a chamber 14 into which the thread end 5 of the bolt 1 enters. If desired oil or grease may be placed in the chamber 14, thereby lengthening the life of the nut 12 and bolt 1. Where it is not desired to use a long bolt, I have shown a bolt 15, which is shorter than bolt 1, and which is also shown as securing beams 2 and 3. This bolt 15 has a nut 16 turned down on the end 17 of the bolt 15. This nut 16 is provided with a recess 18 into which fits a lock washer 9. The lock washer 9 is drawn down similar to that described in reference to bolt 1. This nut 16 is provided with a cap 19, thereby forming a chamber 20 into which may be placed oil or grease in order to protect the bolt 15 and the nut 16 from deteriorating by rusting.

It will be seen from the foregoing that the lock washer 9 is not only kept in position should the same become broken but is also kept from stretching or spreading and thereby falling from the bolt.

What I claim is:

In a device of the class described, a primary nut, a recess formed in the upper portion thereof, a recess formed in the lower portion thereof, lock washers fitting within said recesses a secondary nut less in diameter than the primary nut, a cap end on said secondary nut, substantially as described for the purpose set forth.

In testimony whereof I affix my signature.

WILLIAM J. KELLY.

Witnesses:
C. A. HARPMAN,
HENRY GREENWALD.